United States Patent
Roever et al.

(10) Patent No.: US 11,694,643 B2
(45) Date of Patent: Jul. 4, 2023

(54) LOW LATENCY VARIABLE BACKLIGHT LIQUID CRYSTAL DISPLAY SYSTEM

(71) Applicant: NVIDIA Corporation, Santa Clara, CA (US)

(72) Inventors: Jens Roever, Los Gatos, CA (US); Gerrit Ary Slavenburg, Hayward, CA (US); Robert Jan Schutten, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/337,330

(22) Filed: Jun. 2, 2021

(65) Prior Publication Data
US 2022/0392414 A1 Dec. 8, 2022

(51) Int. Cl.
*G09G 3/20* (2006.01)
*G09G 3/34* (2006.01)
*G09G 3/36* (2006.01)
*G06T 1/20* (2006.01)
*G06V 10/50* (2022.01)

(52) U.S. Cl.
CPC ............. *G09G 3/3426* (2013.01); *G06T 1/20* (2013.01); *G06V 10/507* (2022.01); *G09G 3/2096* (2013.01); *G09G 3/36* (2013.01); *G09G 2320/0266* (2013.01); *G09G 2320/0626* (2013.01)

(58) Field of Classification Search
CPC ...... G09G 3/3426; G09G 3/2096; G09G 3/36; G09G 2320/0266; G09G 2320/0626; G06V 10/507; G06T 1/20
See application file for complete search history.

(56) References Cited

U.S. PATENT DOCUMENTS

| | | | | |
|---|---|---|---|---|
| 9,373,287 | B2 * | 6/2016 | Margerm | G09G 3/3426 |
| 2010/0123742 | A1 * | 5/2010 | Jang | G09G 3/342 345/690 |
| 2011/0134151 | A1 * | 6/2011 | Kwon | G09G 3/3426 345/690 |
| 2014/0253603 | A1 * | 9/2014 | Kwon | G09G 3/3208 345/690 |
| 2016/0225323 | A1 * | 8/2016 | Lu | G09G 3/3406 |
| 2016/0307482 | A1 * | 10/2016 | Huang | G09G 3/002 |
| 2019/0371253 | A1 * | 12/2019 | Morein | G09G 3/3406 |

FOREIGN PATENT DOCUMENTS

KR 20100037104 A * 4/2010 ............ G02B 6/0053

* cited by examiner

*Primary Examiner* — Towfiq Elahi
(74) *Attorney, Agent, or Firm* — Taylor English Duma L.L.P.

(57) ABSTRACT

In various examples, a low-latency variable backlight liquid crystal display (LCD) system is disclosed. The LCD system may reduce latency and video lag by performing an analysis of peak pixel values within subsets of pixels using a rendering device, prior to transmitting the frame to a display device for display. As a result, the display device may receive the peak pixel value data prior to or concurrently with the frame data, and may begin updating the backlight settings of the display without having to wait for a substantial portion of the frame to be received. In this way, the LCD system may avoid the full frame delay of conventional systems, allowing the LCD system to more reliably support high-performance applications such as gaming.

20 Claims, 7 Drawing Sheets

LOW LATENCY VARIABLE BACKLIGHT LIQUID CRYSTAL DISPLAY SYSTEM

BACKGROUND

Liquid crystal displays (LCDs), such as high dynamic range (HDR) LCDs, commonly use a backlight consisting of a matrix of light-emitting diodes (LEDs). To account for differences in brightness across various portions of the display, some of the LEDs may be illuminated more brightly while others may be more dimly lit—often referred to as local dimming. As a result, higher levels of contrast are able to be reached—and HDR capability is able to be achieved—as opposed to fixed backlight display devices where a consistent illumination value is applied to each backlight. To determine the illumination values for the various LEDs, a current may be determined for each LED based on a current frame or image to be displayed, the contribution of each LED to each pixel may then be determined to calculate an illumination field for the pixel, and pixel values for the pixels may be set based on a combination of the associated illumination field and the desired pixel values—e.g., red (R), green (G), and blue (B) values, for RGB displays.

However, traditional algorithms used to make backlight lighting decisions for a current frame either must introduce a delay while waiting for the frame to be received at the LCD device side prior to analysis (in addition to the delay from performing the analysis), or new pixel values must be predicted from previous frames—e.g., resulting in potentially non-optimal decisions for dynamic frame content, such as where pixel values change rapidly between successive frames. As such, traditional algorithms result in display lag (e.g., a time interval from a first line of a rendered frame being transmitting at a rendering device to the first line of the frame being visible on a display device) due to a delay in receiving and analyzing current frame data and/or image artifacts due to under-lit or over-lit frames that relied on previous frames in determining associated pixel values. The introduced lag and/or image artifacts from these traditional methods reduce the overall performance of the system, as well as affect the user experience—especially in high-performance applications such as competitive online or cloud gaming where user response times have a greater impact on user experience and ability.

SUMMARY

Embodiments of the present disclosure relate to low-latency variable backlight liquid crystal display (LCD) systems. Systems and methods are disclosed that, instead of snooping incoming frames on an LCD device side to perform frame analysis, perform frame analysis on a rendering device side. For example, the rendering device may analyze rendered frames to determine peak pixel or pixel cell values within subsets of pixels of the frame, and transmit the peak value determinations to a variable backlight LCD device to process lighting decisions more quickly—e.g., with minimal latency. As such, and in contrast to conventional systems that wait for most or all of a frame to be received in a frame buffer at the LCD device prior to performing frame analysis, the present systems and methods perform the frame analysis at the rendering device—e.g., where the frame is already fully buffered after rendering—prior to or simultaneously with transmitting the rendered frame to the LCI) device. The LCI) device may receive the analyzed frame data prior to receiving the entire frame such that lighting decisions and lighting model determinations may be performed at the LCI) device with minimal latency or delay. For example, by the time a pixel cell value is to be applied to a pixel of the LCD display, updates to the pixel cell value may already be determined based on accumulated lighting contributions of surrounding LEDs, so the pixel may be read out to the LCD without waiting for lighting contribution information to be computed. As a result, instead of introducing almost a full frame delay (e.g., 80% of a frame, at a frame refresh rate of 72 Hz, with a common line frequency of 160.8 KHz, at 4K resolution, the delay may be ~10.7 milliseconds), the only delay may be transmission delay associated with transmitting the analyzed frame data and the frame data (e.g., when transmitting a single line of data containing the lighting information from the analyzed frame data ahead of or concurrently with the full frame data, the delay may be ~6.7 microseconds), thereby increasing the performance of the system and the user-experience—especially for high-performance applications such as gaming.

BRIEF DESCRIPTION OF THE DRAWINGS

The present systems and methods for low-latency variable backlight liquid crystal display (LCD) systems are described in detail below with reference to the attached drawing figures, wherein.

DETAILED DESCRIPTION

Systems and methods are disclosed related to a low-latency variable backlight liquid crystal display (LCD) system. Although primarily described with respect to backlight type LCDs, this is not intended to be limiting. For example, embodiments of the present disclosure may be implemented using any backlight type display, such as single layer LCDs, dual layer LCDs, multiple layer LCDs, mega-zone LCDs, and/or other display types including any number of layers that employ backlighting. Where LCDs are used, the LCD panel may be of any type, such as twisted nematic (TN), in-plane switching (IPS), vertical alignment (VA), advanced fringe field switching (AFFS), and/or other types. In addition, although white light-emitting diode (LED) backlights are primarily described herein, this is not intended to be limiting, and any type of LED backlights—such as red (R), green (G), blue (B) (RGB) LED backlights—may be used, without departing from the scope of the present disclosure. In some embodiments, in addition to or alternatively from LED backlights, other types of backlights may be used, such as, without limitation, cold-cathode fluorescent lamp (CCFL) backlights. The backlights described herein may correspond to any arrangement of backlights, such as edge-lit LEDs (ELEDs), direct-lit LEDs (DLED), local dimming LEDS (e.g., clusters of DLEDs), full array local dimming (FALD) (e.g., with direct control of individual DLEDs), and/or other arrangements.

Figure 1:
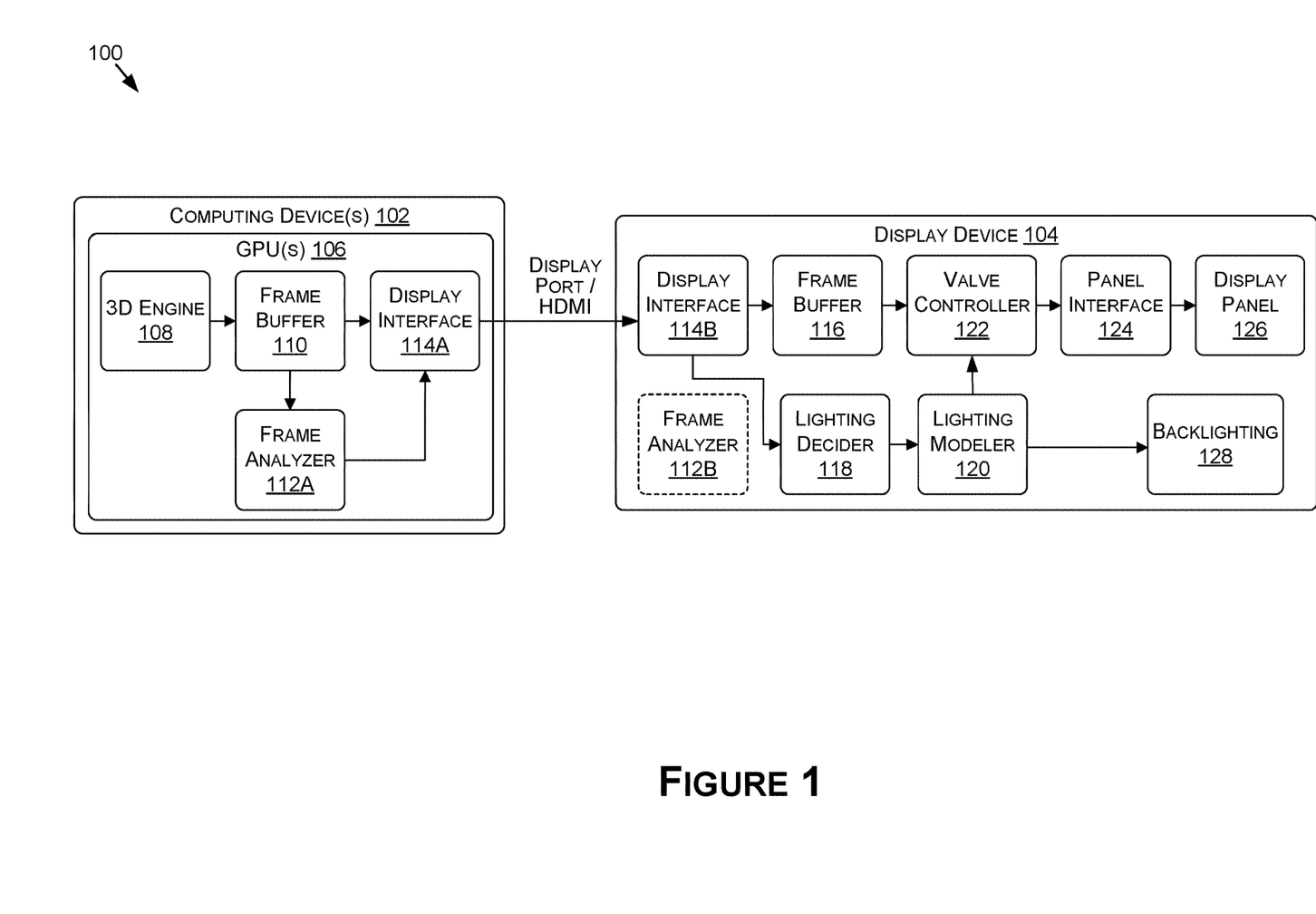
FIG. 1 is a block diagram of a low-latency variable backlight LCD system, in accordance with some embodiments of the present disclosure.

With reference to FIG. 1, FIG. 1 is an example low-latency variable backlight LCD system 100 (alternatively referred to herein as "system 100"), in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the system 100 may include similar components, features, and/or functionality as those of example content streaming system 500 of FIG. 5, example computing device 600 of FIG. 6, and/or example data center 700 of FIG. 7. For example, the system 100 may be implemented locally—e.g., where frames are rendered using a laptop computer, a desktop computer coupled to a display, a tablet computer, a virtual reality, augmented reality, or mixed reality system, etc.—or may be implemented in a cloud-based environment—e.g., a cloud gaming, virtual teleconferencing, streaming, and/or other cloud-based environment—where frames may be rendered remotely using one or more servers, for example, and streamed to a local client device.

The system 100 may include one or more computing devices 102 and/or one or more display devices 104. Although illustrated as discrete components in FIG. 1, this is not intended to be limiting, and the computing device(s) 102 and the display device(s) 104 may be individual components of a single device—such as a laptop computer, a tablet computer, an all-in-one computer, a virtual, augmented, or mixed reality headset, a smart television, a smartphone, and/or the like. In such examples, the computing device(s) 102 (alternatively referred to herein as a "rendering device 102") may include components—such as one or more graphics processing units (GPUs) 106—that render a frame of data prior to transmission to the display device 104 for display. In some embodiments, the computing device(s) 102 and the display device(s) 104 may include discrete devices or components of the system 100, such as a system including a streaming media device and a display, a cloud computing device (e.g., similar to example content streaming system 500 of FIG. 5 and/or example data center 700 of FIG. 7) and a local display (e.g., using an intermediary device, such as a computer, streaming device, game console, etc.), a desktop computer and a coupled display, a game console and a coupled display, another type of computing device 102 (that includes or does not include an integral display) and a coupled display (e.g., a second display), and/or the like.

As such, in some embodiments, the system 100 may correspond to a single device (e.g., an LCD television), or a local device (e.g., a desktop computer, a laptop computer, a tablet computer, etc.), and the components of the system 100 may be executed locally by the system 100. Where the computing device(s) 102 includes a local device—e.g., a game console, a disc player, a smartphone, a computer, a tablet computer, etc., the image data may be transmitted over the network (e.g., a LAN) via a wired and/or wireless connection (e.g., via a display port, HDMI, etc.). For example, the computing device(s) 102 may render an image (which may include reconstructing the image from encoded image data), store the rendered image in the frame buffer 110, scan out the rendered image—e.g., using a video controller—according to a scan order to generate display data, and transmit the display data—e.g., via the display interface 114—to a display device 104 for display.

In other embodiments, some or all of the components of the system 100 may exist separately from the display device 104—e.g., an LCD display device. For example, the computing device(s) 102—including the GPU(s) 106, the 3D engine 108, the frame buffer 110, the display interface 114A, the frame analyzer 112A, and/or a lighting decider 118 (not illustrated as a component of the computing device(s) 102 in FIG. 1)—may be components of another system separate from the display device 104. For example, the system 100 may be a component or node of a distributed computing system—such as a cloud-based system—for streaming images, video, video game instances, etc. In such embodiments, the system 100 may communicate with one or more computing device(s) 102 (e.g., servers) over a network(s) (e.g., a wide area network (WAN), a local area network (LAN), or a combination thereof, via wired and/or wireless communication protocols). For example, a computing device(s) 102 may generate and/or render an image, encode the image, and transmit the encoded image data over the network to another computing device 102 (e.g., a streaming device, a television, a computer, a smartphone, a tablet computer, etc.). The receiving device (which may include another computing device 102 and/or the display device 104 itself) may decode the encoded image data, reconstruct the image (e.g., assign a color value to each pixel), store the reconstructed image data in the frame buffer 116, scan the reconstructed image data out of the frame buffer 110—e.g., using a video controller—according to a scan order to generate display data, and then transmit the display data for display by a display device 104 (e.g., an LCD) of the system 100. Where the image data is encoded, the encoding may correspond to a video compression technology such as, but not limited to, H.264, H.265, M-JPEG, MPEG-4, etc.

As such, whether the process of generating a rendered image for storage in the frame buffer 116 occurs internally (e.g., within the display device 104, such as a television), locally (e.g., via a locally connected computing device 114), remotely (e.g., via one or more servers in a cloud-based system), or a combination thereof, the image data representing values (e.g., color values, etc.) for each pixel of a display may be scanned out of the frame buffer 116 (or other memory device) to generate display data (e.g., representative of voltage values, capacitance values, etc.) configured for use by the display device—e.g., in a digital and/or analog format. In addition, the display device 104—e.g., LCD layer(s) of a display panel 126—may be configured for receiving the display data according to the scan order in order to refresh properly.

The computing device(s) 102 may include a GPU(s) 106—and/or other processor types, such as one or more central processing units (CPUs), one or more data processing units (DPUs), etc.—that is configured to render image data representative of still images, video images, and/or other image types. Once rendered, or otherwise suitable for display by a display device 104 of the system 100, the image data may be stored in memory—such as in the frame buffer 110. In some embodiments, the image data may be representative of a sub-image per panel of a display device 104—e.g., in embodiments where an LCD includes two or more panels. As such, a single image may be divided into two or more separate images to correspond to a number of rows and/or columns of pixels included in each display panel 126.

The GPU(s) 106—and/or other processing unit type(s)—may execute a 3D engine 108, a frame buffer 110, a display interface 114A, and/or a frame analyzer 112A. The 3D engine 108 may include a rendering engine for rendering 3D graphics. Frames (e.g., image, video, etc.) may be generated using the 3D engine 108, and the frames may be stored in the frame buffer 110 once rendered. In conventional systems, once the frames are stored in the frame buffer 110 of the computing device(s) 102, the frame may be sent to the display device 104 via a display interface 114A of the computing device(s) 102 and a display interface 114B of the display device(s) 104. The display interfaces 114 may correspond to DisplayPort, mini DisplayPort, HDMI, mini HDMI, micro HDMI, VGA, mini VGA, DVI-D, DVI-I, mini-DVI, micro-DVI, USB, and/or another display interface type. Once received at the display device(s) 104 and stored in the frame buffer 116, the analysis of the frame for making lighting decisions and controlling backlights of the display device 104 may be executed. However, significant lag or delay may be introduced when waiting to perform the analysis on the frame until at least a portion of the frame is stored in the display-side frame buffer 116. In addition to the lag or delay from frame analysis, the lighting decisions may require more of the frame to be buffered in the frame buffer 116, and the lighting model may further require even more of the frame—e.g., 80% to 100% of the frame. As such, these conventional systems may require up to an entire frame delay prior to making lighting decisions for setting the backlights and adjusting pixel values to account for the backlight settings.

Figure 2A:
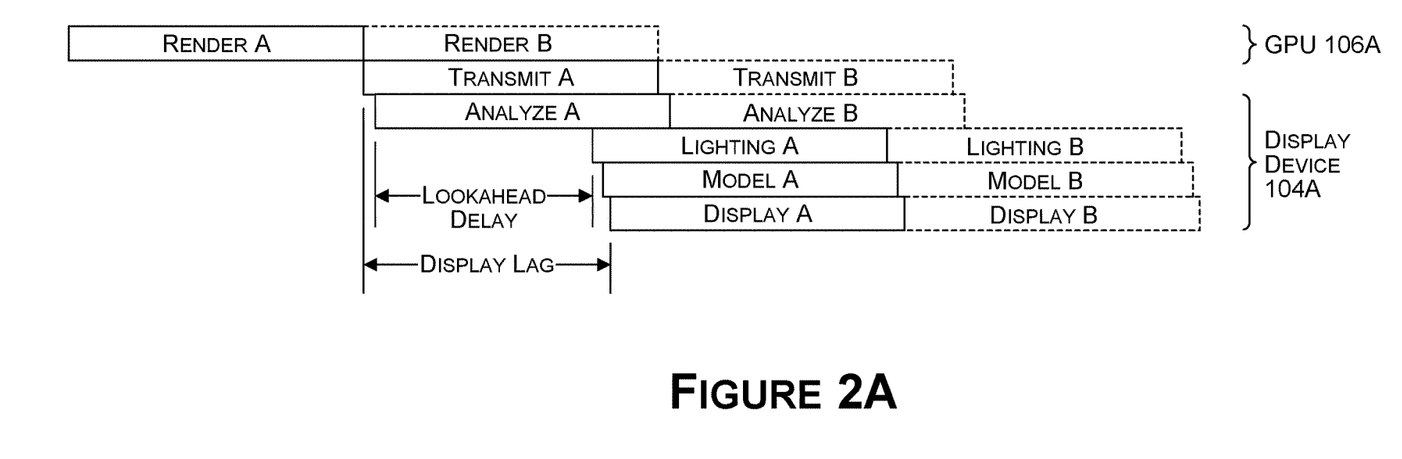
FIG. 2A illustrates look ahead delay and display lag for conventional systems, in accordance with some embodiments of the present disclosure.

As an example, where the frame resolution is reduced to a backlight (e.g., LED) matrix resolution, subsets of pixels may be assigned to respective backlights (e.g., backlight or LED pixel blocks). Although conceptually a subset of pixels may be assigned a respective backlight, the lighting contributions for any individual pixel may come from the respective backlight as well as any number of (e.g., all) other backlights. In embodiments, the frame resolution may be divided by the backlight resolution (or a multiple thereof) to determine the size of the backlight blocks of pixels (or subsets of pixels). In an example where the frame resolution is 3840×2160 and the backlight resolution is 24×16, each backlight pixel block may include a resolution of 160 (e.g., 3840/24)×135 (e.g., 2160/16). As a non-limiting visual example, and with respect to FIG. 3, where the frame resolution is 16×8 and the LED resolution is 4×4, each backlight pixel block may include a resolution of 4×2. As such, backlight pixel block 304A may correspond to backlight 306A, backlight pixel block 304B may correspond to backlight 306B, and so on. As such, to perform frame analysis according to conventional approaches, image data corresponding to a topmost one to one and a half backlight blocks of pixels (e.g., using a top down scan order) may have to be buffered in the frame buffer 116. To determine lighting decisions, an additional three backlight blocks of pixels may have to be buffered in the frame buffer 116, and to determine the lighting model, an additional ten backlight blocks of pixels (e.g., equal to 14 or 14.5 backlight blocks of pixels). As such, in the example of 3840×2160 frame resolution and 24×16 backlight resolution, 14 to 14.5 out of 16 rows of backlight blocks of pixels may be required to be stored in the frame buffer 116 before a frame is actually displayed. This lag or delay in conventional systems is illustrated in FIG. 2A, where a frame A is rendered using GPU 106A, transmitted to display device 104A, analyzed using frame analysis, analyzed for lighting decisions, analyzed for a lighting model, and then displayed. As illustrated in FIG. 2A, the display lag includes almost a full frame delay.

Figure 2B:
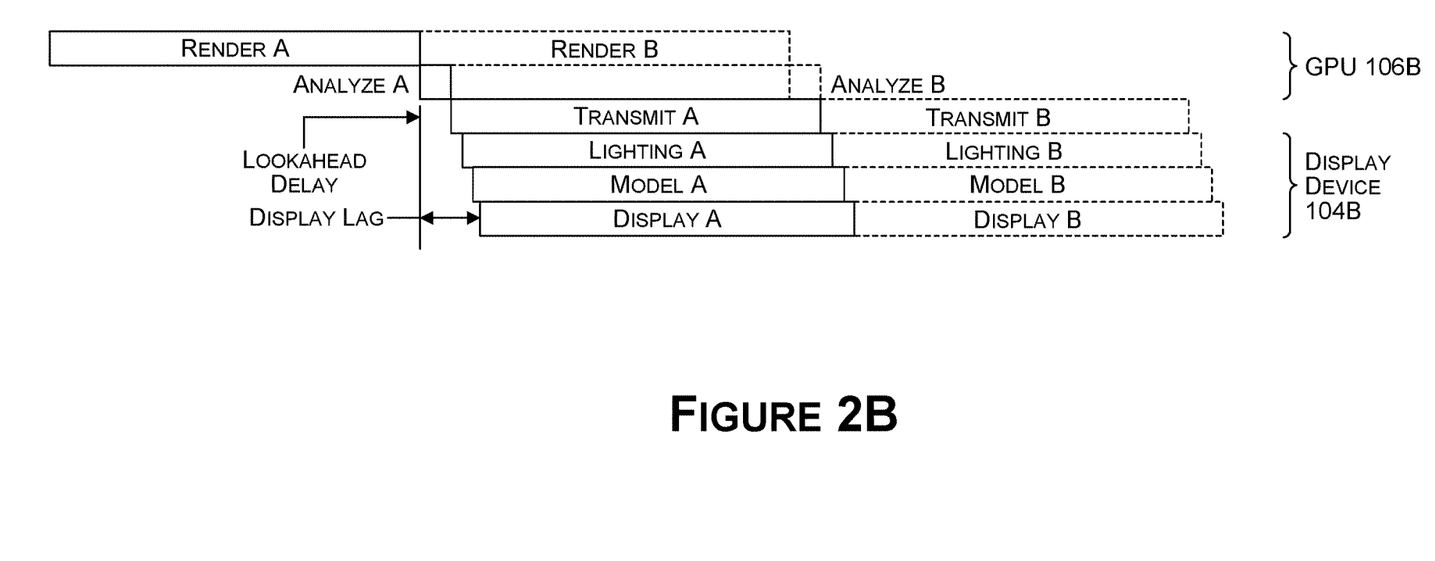
FIG. 2B illustrates look ahead delay and display lag for the low-latency variable backlight LCD system of FIG. 1, in accordance with some embodiments of the present disclosure.

To account for these drawbacks of conventional systems, the system 100 may include a frame analyzer 112A on the computing device(s) 102 to take advantage of the entire frame being stored in the frame buffer 110. As a result, rather than snooping on the incoming frame data in the display-side frame buffer 116, the frame analysis may be executed at the computing device(s) 102, and data representative of the output of frame analysis—e.g., peak pixel values—may be transmitted prior to or concurrently with the frame or image data across the display interface 114. In such an example, the peak pixel values information may be used—e.g., immediately upon receipt—by the lighting decider 118 and the lighting modeler 120 of the display device 104 to update pixel values and to set the illumination settings of backlights 128 of the display device 104. In such an example, and as illustrated in FIG. 2B, the only delay may be the transmission delay and/or any additional processing delay by the lighting decider 118 and/or the lighting modeler 120. During experimentation, using the example of a frame resolution of 3840×2160, a backlight resolution is 24×16, a frame refresh rate of 72 Hz, and a common line frequency of 160.8 KHz, the look ahead delay for the system 100 may be ~6.2 microseconds (e.g., delay from transmitting data (a single line, in embodiments) representative of the analyzed lighting information (peak pixel value(s)) corresponding to the full frame) as compared to a look ahead delay of ~10.7 milliseconds (e.g., 0.8 (80% of the frame)×2160 lines of pixels×6.2 microseconds per line) in the example conventional implementation of FIG. 2A.

As such, within the system 100, once a frame is buffered in the frame buffer 110, the frame analyzer 112A may analyze the frame to determine one or more peak pixel values. For example, the frame analyzer 112A may determine, for each backlight pixel block (e.g., for each 160×135 block of pixels where a 3840×2160 frame resolution and a 24×16 backlight resolution is used), one or more peak pixel values. Where the display panel 126 includes an RGB display panel—such an LCD RGB panel—the peak pixel value(s) may include a peak red cell value (e.g., corresponding to a cell including an LC valve and an in-line red filter), a peak green cell value, and/or a peak blue cell value. In some embodiments, the peak value(s) may correspond to an actual peak value for one or more of the cells of the backlight pixel block, or may correspond to a filtered or analyzed peak value. For example, where a filtered peak pixel value(s) is used, outlier pixel values (e.g., which may be indicative of noise) may be filtered out such as to not allow an outlier or a single high value pixel have a negative impact on other pixels of the block—e.g., where the majority of other pixels have lower pixel values (e.g., closer to 0 on a scale of 0-255) that would require less illumination from backlighting. To filter out outliers, in embodiments, one or more histograms may be generated for each backlight pixel block—e.g., a red cell histogram, a green cell histogram, and/or a blue cell histogram—to determine a filtered peak red, green, and/or blue cell value(s) for the backlight pixel block. In other embodiments, a single histogram may be generated that includes all pixel values—e.g., inclusive of red, green, blue, and/or other color cells values. In any example, the histogram may be used to determine a filtered peak value(s) that may be determined to be associated with a respective backlight pixel block. The filtered peak value(s) selected may not correspond to the bin(s) with the most data, but may be used to select the bin(s) of highest value that has a threshold number (e.g., 3 or more entries) or percentage of data (e.g., 1% or greater). In some examples, the selected peak value(s) from the histograms may correspond to a peak value that still allows some threshold number or percentage (e.g., greater than 90%) of other pixels in a same backlight pixel block to hit their correct pixel value. For example, where an actual peak pixel value may not allow for other pixels of lower value (e.g., closer to 0 on a scale of 0-255) to reach their value (e.g., due to over-lighting), the histogram may be used to determine a peak pixel value that will still allow at least some threshold number or percentage of the other pixels of lower value (and/or other pixels of higher value) to achieve their associated pixel value. As a result, a single high value outlier pixel may not be relied upon as the peak pixel value for the backlight pixel block.

In some embodiments, temporal and/or spatial smoothing may be used to determine the peak value(s) for a given backlight pixel block. For example, one or more prior frames of data may be used to determine the peak value(s)—e.g., where one or more prior frames included a low peak pixel value for a given backlight pixel block, and the current frame includes a very high peak pixel value, the current peak pixel value may be weighted by the low peak pixel value(s) of one or more prior frames. Similarly, where a peak pixel value is determined for a given pixel cell, one or more neighboring pixel cells may be analyzed to determine if there is a sharp contrast in pixel values. In such an example, where there is a sharp contrast in neighboring pixel values (e.g., a peak pixel value cell is neighbored by pixel cells with much lower values), the peak pixel value may be weighted in view of the neighboring pixel cell(s) to reduce the value.

The outputs or determinations of the frame analyzer 112A—e.g., the one or more peak pixel values corresponding to each backlight pixel block—may then be transmitted to the display device 104 via the display interfaces 114. The data may be transmitted prior to and/or concurrently with the image data stored in the frame buffer 110, and the data may correspond to an extra line of image or video data. In some embodiments, this peak value data may include a number of values corresponding to the backlight resolution times the number of peak values per backlight pixel block. As such, in the 24×16 backlight resolution example, where a peak red, green, and blue cell value are determined for each frame, the peak pixel data may include 24×16×3 (or 1152) values. As another example, where a single peak pixel value is determined for each backlight pixel block, the peak pixel data may include 24×16 (or 384) values.

In some embodiments, the frame analysis may be executed using the GPU(s) 106—and/or other processing unit types—in parallel with existing post-processing steps (e.g., tone mapping, such that no or minimal additional delay is introduced by frame analysis (other than the transmission delay of transmitting the peak pixel value data) as compared to existing systems. For example, one or more parallel processing units—e.g., threads of the GPU(s) 106—may be used to execute the existing post-processing techniques and the frame analysis in parallel.

Frame analyzer 112B is illustrated on the display device 104 to capture implementations where the display device 104 and/or the computing device(s) 102 are not configured for computing device side frame analysis. As such, in these embodiments, the frame analysis may take place on the display device 104.

Once the peak value data is received, the lighting decider 118 has all of the information necessary to begin processing the lighting decisions for each of the backlights 128. For example, the lighting decider 118 may use the peak pixel value(s) for the backlight blocks of pixels to determine illumination values for—and thus current values to drive to—each of the backlights 128. For example, the lighting decision may look at one or more backlights (e.g., LEDs) in proximity to a currently evaluated backlight pixel block. In such an example, the backlights evaluated for any given backlight pixel block may include a backlight most closely located with respect to a center pixel(s) of the backlight pixel block and, in embodiments, one or more adjacent backlights (e.g., backlights within five or less rows and/or five or less columns of the closest backlight to the center pixel). Although five or less rows and/or five or less columns is described, this is for example purposes only, and not intended to be limiting. In some examples, any number of (e.g., three, four, five, six, etc.) of the backlights may be factored into the evaluation. The determination of the number of rows and/or columns of backlights to consider may be based on shape of a single backlights light distribution (e.g., the more concentrated the shape of the light distribution to the area covered by a single backlight, the lower the amount of surrounding backlights are needed to be taken into account). Similarly, the selection of the number of columns and/or rows may be based on a compromise or a balance between latency, compute (e.g., the more reach the more compute), and/or over-lighting (e.g., too little reach may result in over-lighting). As such, the lighting decisions for the most proximate backlight(s) may allow for factoring in the accumulated light from the one or more backlights that have the most impact on the illumination field for the backlight pixel block. Where additional backlights are factored in other than the backlight most closely located with respect to the center pixel of the backlight pixel block, these additional backlights may be used to add extra illumination for achieving higher pixel values (e.g., values closer to 255 on a scale of 0-255). In addition, by only factoring in the most proximate backlights to the backlight pixel block, the processing requirements may be reduced, thereby decreasing runtime of the system 100 without much sacrifice to the accuracy of the lighting decisions (e.g., because the proximately located backlights may contribute the majority of the light to the backlight pixel block).

Figure 3:
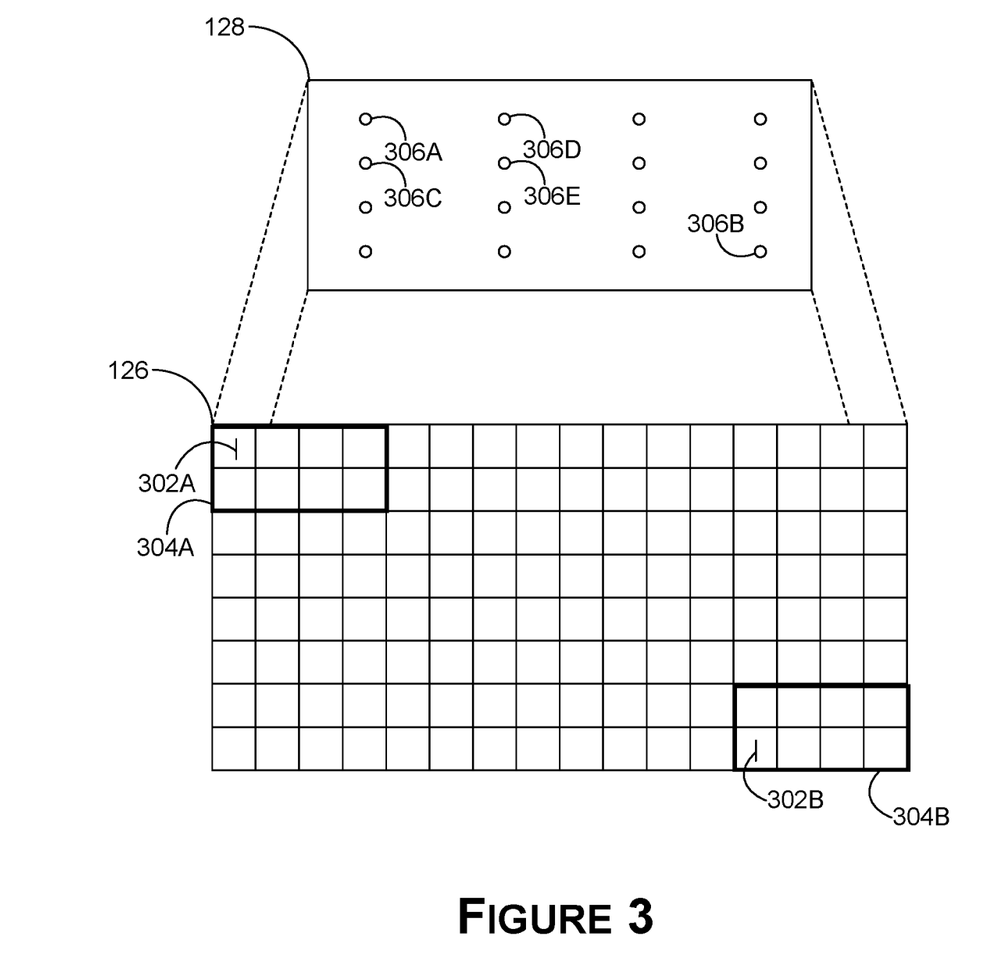
FIG. 3 illustrates an example display device and corresponding pixels, backlights, and backlight blocks of pixels, in accordance with some embodiments of the present disclosure.

As an example, and with respect to FIG. 3, to determine the lighting decisions for backlights 306 associated with the backlight pixel block 304A, the backlight 306A and one or more adjacent backlights 306C, 306D, and/or 306E may be factored in to achieve the proper illumination levels for the pixels of the backlight pixel block 304A. This process may be repeated for each backlight pixel block and/or each backlight until a final lighting decision is determined for the particular frame. The current values for the backlights may then be set for the backlighting 128 and the associated current may be driven to the backlights 306 when the frame data is read out of the frame buffer and processed by a valve controller 122.

Referring again to FIG. 1, the lighting decisions for the backlights 128 may be used to by the lighting modeler 120 to drive the current values to the backlighting 128 and to aid in updating the pixel values along with the valve controller 122. For example, once the illumination values or settings are determined for each of the backlights, an accumulated illumination field for each pixel cell or valve (e.g., a pixel may have a red cell, green cell, and/or blue cell in an RGB LCD display) may be known. Using the accumulated illumination value for each pixel cell—which may factor in illumination contributions from any number (e.g., all) of the backlights 128 of the display device 104—updates to the pixel values buffered in the frame buffer 116 may be made for one or more of the pixel cells to account for the accumulated illumination at that cell. For example, where a particular pixel—e.g., pixel 302A of FIG. 3—has a pixel value of 240 on a scale of 0-255, and the backlights 306A, 306B, 306D, 306C, and 306E (and/or other backlights that contribute to the accumulated illumination field at the pixel 302A) are lit dimly, the pixel value may be updated to a pixel value of 255 to account for the lower brightness achievable using the current backlighting settings. In such an example, were the original pixel value to be maintained, a voltage may be applied to a cell(s) of the pixel 302A corresponding to a value of 240, and due to the dimly lit illumination field, the resulting pixel value may more closely represent a value of 225. As such, by increasing the pixel value—and thus the voltage applied to the cell(s) of the pixel 302A—the resulting pixel value displayed on the display device 104 may more closely resemble the original value of 240. A similar process may take place to reduce the brightness of a pixel cell(s) when the accumulated illumination field is very bright. For example, a voltage applied to the pixel cell(s) may be reduced to account for the additional accumulated light at the pixel cell(s), such that the original pixel value may be more accurately represented during display.

The updated pixel values as determined using the lighting modeler 120 and the valve controller 122, in addition to the illumination settings for each of the backlights 128, may be used to display the frame on the display panel 126. For example, the valve controller 122 may read the pixel values out of the frame buffer according to a scan order (e.g., top-down, middle-out, etc.), may update one or more of the pixel values based on the lighting model, and may transmit the updated pixel values—e.g., may cause a voltage to be driven to the pixel cells based on the updated pixel values—via the panel interface 124 to the display panel 126. At substantially the same time (e.g., as the lines of pixels are scanned out for display, the associated backlights may be lit in unison), the lighting modeler 120 may drive the current values to the backlighting 128 to cause the backlights to illuminate according to their respective illumination settings.

The display panel 126 may include any number of layer that may include any number of cells (or valves) that may each correspond to a pixel or a sub-pixel of a pixel. For example, the layers may include a red, green, and blue (RGB) layer where each cell may correspond to a sub-pixel having an associated color (e.g. red, green, or blue) associated therewith via one or more color filter layers of the system 100. As such, a first cell may correspond to a first sub-pixel with a red color filter in series therewith, a second cell may correspond to a second sub-pixel with a blue color filter in series therewith, and so on. Although an RGB layer is described herein, this is not intended to be limiting, and any different individual color or combination of colors may be used depending on the embodiment. For example, in some embodiments, the layers may include a monochrome or grayscale (Y) layer that may correspond to some grayscale range of colors from black to white. As such, a cell of a Y layer may be adjusted to correspond to a color on the grayscale color spectrum.

Where the display device 104 corresponds to an LCD, once the updated values (e.g., color values, voltage values, capacitance values, etc.) are determined for each cell of each layer of the display panel 126—e.g., using the frame buffer 116, a video controller, the valve controller 122, the panel interface 124, etc.—signals corresponding to the updated values may be applied to each cell via row drivers and column drivers controlled according to shift registers and a clock. For example, for a given cell, a row driver corresponding to the row of the cell may be activated according to a shift register (e.g., activated to a value of 1 via a corresponding flip-flop), and a column driver corresponding to the column of the cell may be activated to drive a signal—e.g., carrying a voltage—to a transistor/capacitor pair of the cell. As a result, the capacitor of the cell may be charged to a capacitance value corresponding to the color value for the current frame of the image data. This process may be repeated according to a scan order—e.g., from top left to bottom right, middle-out, etc.—for each cell of each layer of the LCD.

As a non-limiting example of an implementation of the system 100, the GPU(s) 106 of the computing device(s) 102—which may include a cloud-based device, a local device, a device integrated with the display device 104, and/or another device type—may query the display device 104 (e.g., via HDMI, DisplayPort, and/or another display interface type) to detect or determine whether the monitor has low-latency HDR capability—e.g., whether the monitor is configured to receive the peak pixel value data from the computing device(s) 102 or not. For example, the computing device(s) 102 may perform discovery for extended display identification data (EDID), and the EDID field may include data indicating that the display device 102 is configured for low-latency HDR mode. Where the display device 104 is configured for low-latency HDR according to the systems and methods described herein, the GPU(s) 106 may receive the preferred or associated frame analysis geometry—which may include the backlight resolution, a multiple thereof, and/or another frame analysis geometry. On request of the GPU(s) 106, the display device 104 may enter the low-latency HDR mode. After rendering a frame, and storing the frame in the frame buffer 110, the GPU may perform an analysis pass over the complete frame—using the known frame analysis geometry—to generate reduced geometry frame analysis data. As an example, this may include determining a maximum component value for R, G, and B values individually for each backlight pixel block, and/or may include performing some filtering, generating histograms, and/or other analysis to determine the peak pixel values. Where the frame resolution is 3840×2160, for example, and the backlight resolution is 24×16, the frame analysis process may include determining the peak pixel value data for each 160×135 rectangle of pixels (e.g., for each backlight pixel block). The GPU(s) 106 may perform other operations on the complete frame data—such as tone-mapping where floating point data is converted to integer data—and the frame analysis operation may be executed in parallel with tone-mapping and/or other post-processing operations, thus not incurring extra memory bandwidth for the GPU system and not causing additional delay other than the amount of time required to transmit one additional line of video or image data corresponding to the peak pixel values. As such, ahead of (e.g., during vertical blanking) or concurrently with sending the frame data to the display device 104, the GPU(s) 106 may transmit the peak pixel values (e.g., 1152 analysis values—24×16×3 values). The display device 104 may receive the peak pixel value data and, since the display device 104 is in low-latency HDR mode, the display device 104 may strip the incoming peak pixel value data from the data packages directly to the lighting decider 118—e.g., bypassing the frame analysis stage at the display-side.

Figure 4:
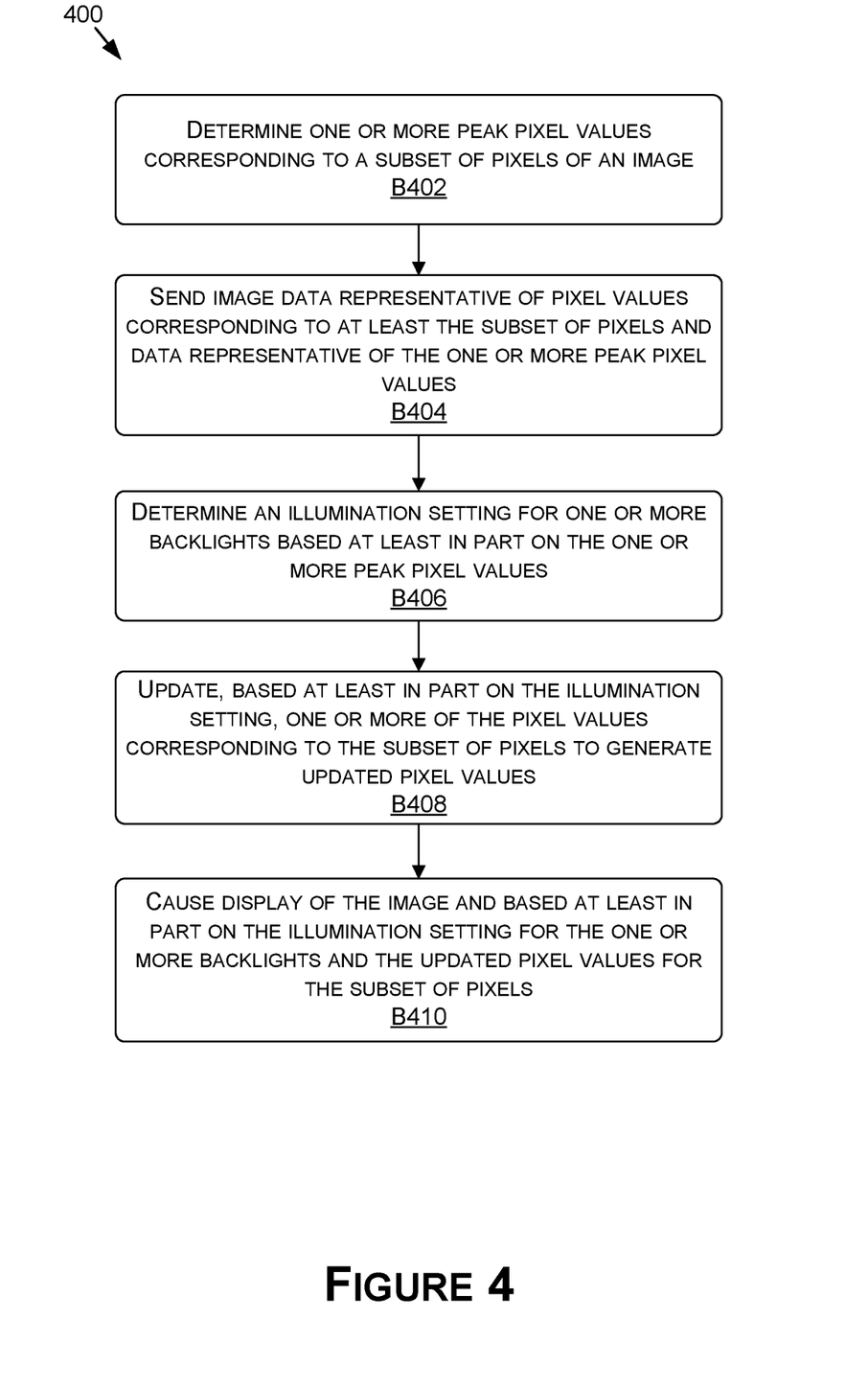
FIG. 4 is a flowchart illustrating a method for determining lighting settings and pixel values for low-latency variable backlight displays, in accordance with some embodiments of the present disclosure.

Now referring to FIG. 4, each block of method 400, described herein, comprises a computing process that may be performed using any combination of hardware, firmware, and/or software. For instance, various functions may be carried out by a processor executing instructions stored in memory. The method 400 may also be embodied as computer-usable instructions stored on computer storage media. The method 400 may be provided by a standalone application, a service or hosted service (standalone or in combination with another hosted service), or a plug-in to another product, to name a few. In addition, method 400 is described, by way of example, with respect to the system 100 of FIG. 1. However, this method 400 may additionally or alternatively be executed by any one system, or any combination of systems, including, but not limited to, those described herein.

FIG. 4 is a flow diagram showing a method 400 for determining lighting settings and pixel values for low-latency variable backlight displays, in accordance with some embodiments of the present disclosure. The method 400, at block B402, includes determining one or more peak pixel values corresponding to a subset of pixels of an image. For example, the frame analyzer of the computing device(s) 102 may analyze the frame data corresponding to an image to determine one or more peak pixel values corresponding to each backlight pixel block.

The method 400, at block B404, includes sending image data representative of pixel values corresponding to at least the subset of pixels and data representative of the one or more peak pixel values. For example, the computing device(s) 102—e.g., via the display interface 114A—may send the pixel value data prior to or concurrently with the image or frame data.

The method 400, at block B406, includes determining an illumination setting for one or more backlights based at least in part on the one or more peak pixel values. For example, the lighting decider 118 may analyze the peak pixel values to determine illumination settings for one or more of the backlights 128. The one or more backlights may, in some non-limiting embodiments, include a backlight most closely located with respect to a center pixel of the backlight pixel block and/or one or more proximate backlights 128 (e.g., backlights within four or less rows of backlights and/or four or less columns of backlights).

The method 400, at block B408, includes updating, based at least in part on the illumination setting, one or more of the pixel values corresponding to the subset of pixels to generate updated pixel values. For example, the valve controller 122 may use the lighting model from the lighting modeler 120 to update one or more pixel values—e.g., to drive a different voltage and/or capacitance—of the backlight block of pixels to account for the accumulated illumination field for the pixel cells or valves. The updated pixel values may include the original pixels values, updated pixel values, or a combination thereof, depending on the associated illumination field for a given frame.

The method 400, at block B410, includes causing display of the image based at least in part on the illumination setting for the one or more backlights and the updated pixel values for the subset of pixels. For example, the lighting modeler 120 may cause a current to be driven to the one or more backlights 128 that corresponds to the illumination setting for the one or more backlights, and the valve controller 122 via the panel interface 124 may cause a voltage to be driven to the cells of the display panel 126 that corresponds to the updated pixel values.

Example Content Streaming System

Figure 5:
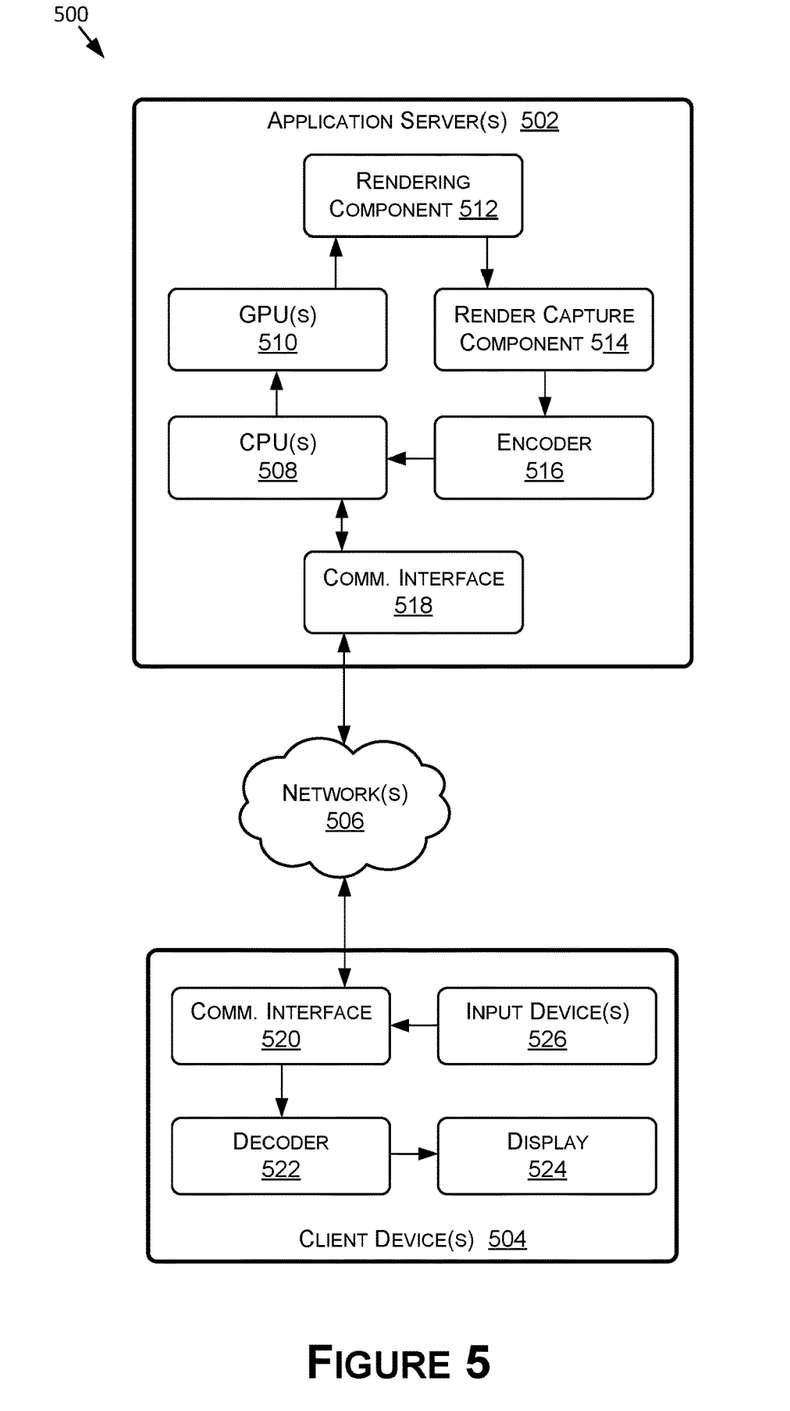
FIG. 5 is a block diagram of an example content streaming system suitable for use in implementing some embodiments of the present disclosure.

Now referring to FIG. 5, FIG. 5 is an example system diagram for a content streaming system 500, in accordance with some embodiments of the present disclosure. FIG. 5 includes application server(s) 502 (which may include similar components, features, and/or functionality to the example computing device 600 of FIG. 6), client device(s) 504 (which may include similar components, features, and/or functionality to the example computing device 600 of FIG. 6), and network(s) 506 (which may be similar to the network(s) described herein). In some embodiments of the present disclosure, the system 500 may be implemented. The application session may correspond to a game streaming application (e.g., NVIDIA GeFORCE NOW), a remote desktop application, a simulation application (e.g., autonomous or semi-autonomous vehicle simulation), computer aided design (CAD) applications, virtual reality (VR) and/or augmented reality (AR) streaming applications, deep learning applications, and/or other application types.

In the system 500, for an application session, the client device(s) 504 may only receive input data in response to inputs to the input device(s), transmit the input data to the application server(s) 502, receive encoded display data from the application server(s) 502, and display the display data on the display 524. As such, the more computationally intense computing and processing is offloaded to the application server(s) 502 (e.g., rendering—in particular ray or path tracing—for graphical output of the application session is executed by the GPU(s) of the game server(s) 502). In other words, the application session is streamed to the client device(s) 504 from the application server(s) 502, thereby reducing the requirements of the client device(s) 504 for graphics processing and rendering.

For example, with respect to an instantiation of an application session, a client device 504 may be displaying a frame of the application session on the display 524 based on receiving the display data from the application server(s) 502. The client device 504 may receive an input to one of the input device(s) and generate input data in response. The client device 504 may transmit the input data to the application server(s) 502 via the communication interface 520 and over the network(s) 506 (e.g., the Internet), and the application server(s) 502 may receive the input data via the communication interface 518. The CPU(s) may receive the input data, process the input data, and transmit data to the GPU(s) that causes the GPU(s) to generate a rendering of the application session. For example, the input data may be representative of a movement of a character of the user in a game session of a game application, firing a weapon, reloading, passing a ball, turning a vehicle, etc. The rendering component 512 may render the application session (e.g., representative of the result of the input data) and the render capture component 514 may capture the rendering of the application session as display data (e.g., as image data capturing the rendered frame of the application session). The rendering of the application session may include ray or path-traced lighting and/or shadow effects, computed using one or more parallel processing units—such as GPUs, which may further employ the use of one or more dedicated hardware accelerators or processing cores to perform ray or path-tracing techniques—of the application server(s) 502. In some embodiments, one or more virtual machines (VMs)—e.g., including one or more virtual components, such as vGPUs, vCPUs, etc.—may be used by the application server(s) 502 to support the application sessions. The encoder 516 may then encode the display data to generate encoded display data and the encoded display data may be transmitted to the client device 504 over the network(s) 506 via the communication interface 518. The client device 504 may receive the encoded display data via the communication interface 520 and the decoder 522 may decode the encoded display data to generate the display data. The client device 504 may then display the display data via the display 524.

Example Computing Device

Figure 6:
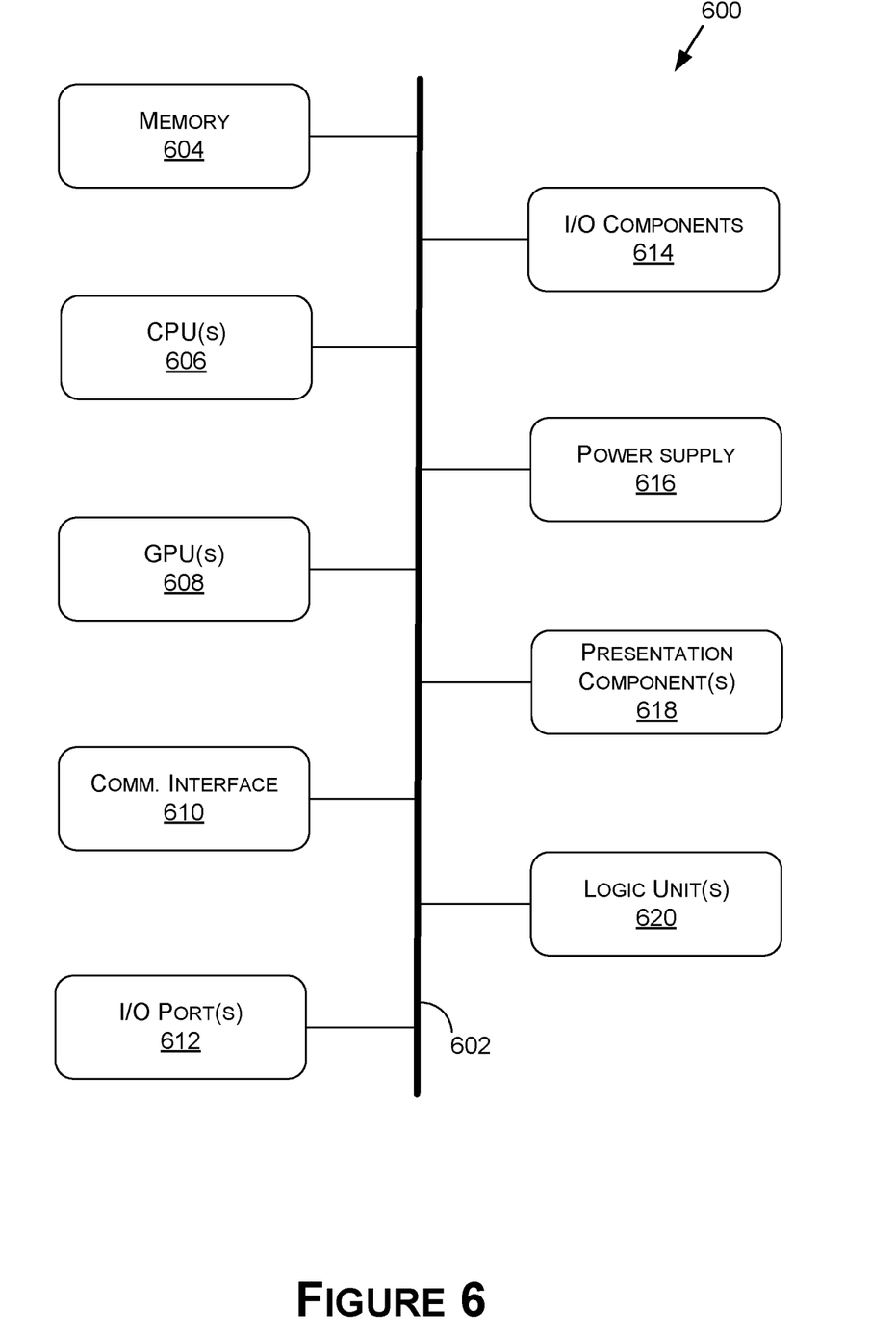
FIG. 6 is a block diagram of an example computing device suitable for use in implementing some embodiments of the present disclosure.

FIG. 6 is a block diagram of an example computing device(s) 600 suitable for use in implementing some embodiments of the present disclosure. Computing device 600 may include an interconnect system 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, one or more presentation components 618 (e.g., display(s)), and one or more logic units 620. In at least one embodiment, the computing device(s) 600 may comprise one or more virtual machines (VMs), and/or any of the components thereof may comprise virtual components (e.g., virtual hardware components). For non-limiting examples, one or more of the GPUs 608 may comprise one or more vGPUs, one or more of the CPUs 606 may comprise one or more vCPUs, and/or one or more of the logic units 620 may comprise one or more virtual logic units. As such, a computing device(s) 600 may include discrete components (e.g., a full GPU dedicated to the computing device 600), virtual components (e.g., a portion of a GPU dedicated to the computing device 600), or a combination thereof.

Although the various blocks of FIG. 6 are shown as connected via the interconnect system 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 6.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608.

Examples of the logic unit(s) 620 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 610 may include one or more receivers, transmitters, and/or transceivers that enable the computing device 600 to communicate with other computing devices via an electronic communication network, included wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 620 and/or communication interface 610 may include one or more data processing units (DPUs) to transmit data received over a network and/or through interconnect system 602 directly to (e.g., a memory of) one or more GPU(s) 608.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, DPUs, etc.), and output the data (e.g., as an image, video, sound, etc.).

Example Data Center

Figure 7:
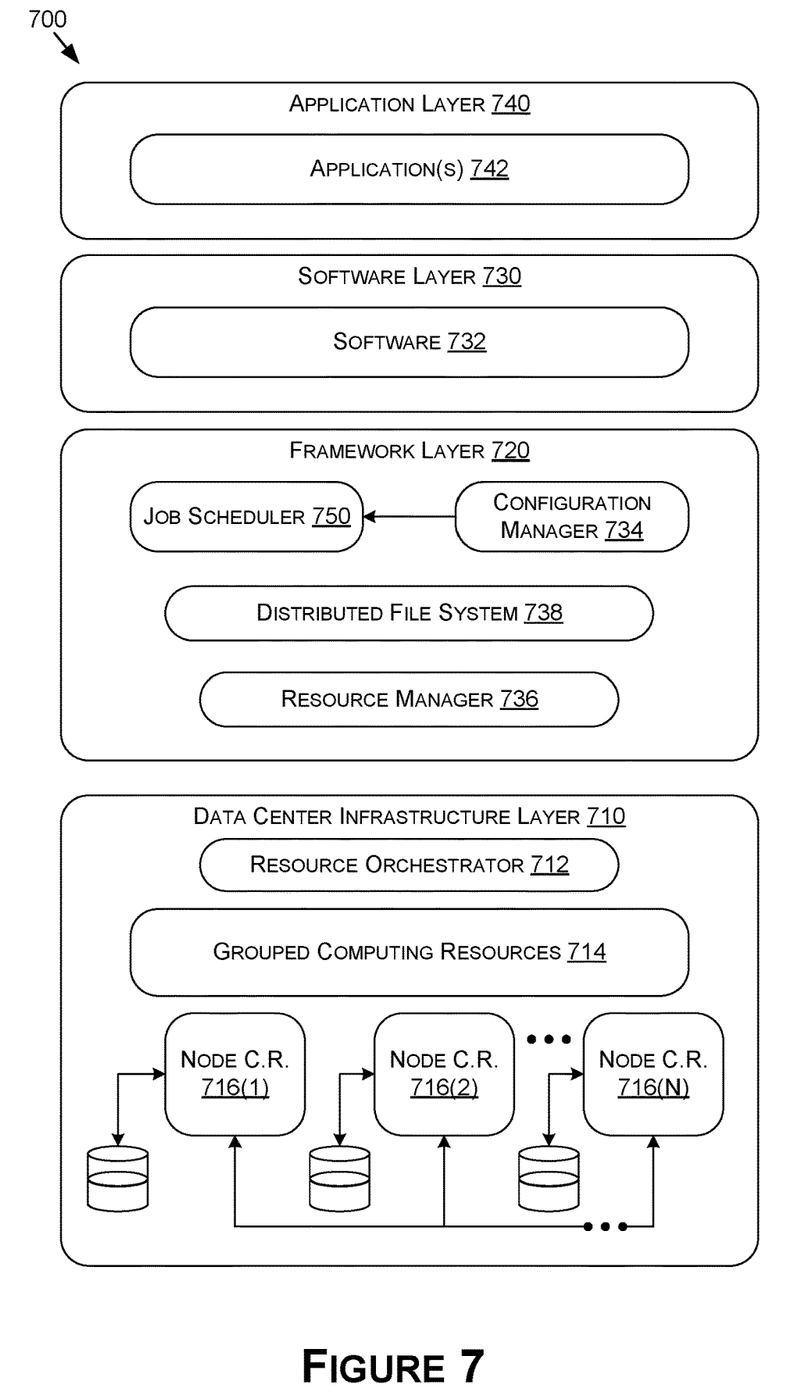
FIG. 7 is a block diagram of an example data center suitable for use in implementing some embodiments of the present disclosure.

FIG. 7 illustrates an example data center 700 that may be used in at least one embodiments of the present disclosure. The data center 700 may include a data center infrastructure layer 710, a framework layer 720, a software layer 730, and/or an application layer 740.

As shown in FIG. 7, the data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 716(1)-716(N) may correspond to a server having one or more of the above-mentioned computing resources. In addition, in some embodiments, the node C.R.s 716(1)-716(N) may include one or more virtual components, such as vGPUs, vCPUs, and/or the like, and/or one or more of the node C.R.s 716(1)-716(N) may correspond to a virtual machine (VM).

In at least one embodiment, grouped computing resources 714 may include separate groupings of node C.R.s 716 housed within one or more racks (not shown), or many racks housed in data centers at various geographical locations (also not shown). Separate groupings of node C.R.s 716 within grouped computing resources 714 may include grouped compute, network, memory or storage resources that may be configured or allocated to support one or more workloads. In at least one embodiment, several node C.R.s 716 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 712 may configure or otherwise control one or more node C.R.s 716(1)-716(N) and/or grouped computing resources 714. In at least one embodiment, resource orchestrator 712 may include a software design infrastructure (SDI) management entity for the data center 700. The resource orchestrator 712 may include hardware, software, or some combination thereof.

In at least one embodiment, as shown in FIG. 7, framework layer 720 may include a job scheduler 750, a configuration manager 734, a resource manager 736, and/or a distributed file system 738. The framework layer 720 may include a framework to support software 732 of software layer 730 and/or one or more application(s) 742 of application layer 740. The software 732 or application(s) 742 may respectively include web-based service software or applications, such as those provided by Amazon Web Services, Google Cloud and Microsoft Azure. The framework layer 720 may be, but is not limited to, a type of free and open-source software web application framework such as Apache Spark™ (hereinafter "Spark") that may utilize distributed file system 738 for large-scale data processing (e.g., "big data"). In at least one embodiment, job scheduler 750 may include a Spark driver to facilitate scheduling of workloads supported by various layers of data center 700. The configuration manager 734 may be capable of configuring different layers such as software layer 730 and framework layer 720 including Spark and distributed file system 738 for supporting large-scale data processing. The resource manager 736 may be capable of managing clustered or grouped computing resources mapped to or allocated for support of distributed file system 738 and job scheduler 750.

In at least one embodiment, clustered or grouped computing resources may include grouped computing resource 714 at data center infrastructure layer 710. The resource manager 736 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 738 of framework layer 720. One or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 738 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 734, resource manager 736, and resource orchestrator 712 may implement any number and type of self-modifying actions based on any amount and type of data acquired in any technically feasible fashion. Self-modifying actions may relieve a data center operator of data center 700 from making possibly bad configuration decisions and possibly avoiding underutilized and/or poor performing portions of a data center.

The data center 700 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 700. In at least one embodiment, trained or deployed machine learning models corresponding to one or more neural networks may be used to infer or predict information using resources described above with respect to the data center 700 by using weight parameters calculated through one or more training techniques, such as but not limited to those described herein.

In at least one embodiment, the data center 700 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 600 of FIG. 6—e.g., each device may include similar components, features, and/or functionality of the computing device(s) 600. In addition, where backend devices (e.g., servers, NAS, etc.) are implemented, the backend devices may be included as part of a data center 700, an example of which is described in more detail herein with respect to FIG. 7.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 600 described herein with respect to FIG. 6. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a hand-held communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:
1. A system comprising:
a computing device to:
receive, from a display device, first data representing a frame analysis geometry associated with the display device;
determine one or more peak pixel values corresponding to a subset of pixels based at least in part on analyzing, using the frame analysis geometry, image data corresponding to at least the subset of pixels of a frame;

send pixel data representative of the one or more peak pixel values; and send the image data representative of pixel values corresponding to at least the subset of pixels; and the display device communicatively coupled to the computing device, the display device to:

determine, based at least in part on the pixel data, an illumination setting for one or more backlights of the display device located proximate the subset of pixels on the display device;

update, based at least in part on the illumination setting, one or more of the pixel values corresponding to the subset of pixels to generate one or more updated pixel values; and cause display of the frame using the illumination setting for the one or more backlights and the one or more updated pixel values for the subset of pixels.

2. The system of claim 1, wherein the updating the one or more of the pixel values is further based at least in part on one or more illumination settings corresponding to one or more other backlights of the display device different from the one or more backlights of the display device.

3. The system of claim 1, wherein the subset of pixels corresponds to a backlight resolution of the display device, such that each subset of pixels, including the subset of pixels, includes a horizontal resolution equal to a number of columns of pixels divided by a number of columns of backlights and a vertical resolution equal to a number of rows of pixels divided by a number of rows of backlights.

4. The system of claim 3, wherein the one or more backlights located proximate the subset of pixels includes backlights within five or less rows of a closest backlight to a center pixel of the subset of pixels and within five or less columns of the closest backlight to the center pixel of the subset of pixels.

5. The system of claim 1, wherein the display device includes a liquid-crystal display (LCD) device, and the one or more backlights include light-emitting diodes (LEDs).

6. The system of claim 1, wherein the pixel data representative of the one or more peak pixel values includes at least one of a peak red value, a peak green value, or a peak blue value corresponding to the subset of pixels.

7. The system of claim 1, wherein the determining the one or more peak pixel values includes:

generating one or more histograms corresponding to the pixel values of the subset of pixels; and determining the one or more peak pixel values using the one or more histograms.

8. The system of claim 1, wherein the updating the one or more of the pixel values corresponding to the subset of pixels is based at least in part on an accumulated lighting contribution of backlights of the display device, the backlights including the one or more backlights and one or more other backlights in addition to the one or more backlights.

9. The system of claim 1, wherein the system is comprised in at least one of:

a system implemented using an edge device;

a system incorporating one or more virtual machines (VJVIs);

a system implemented at least partially in a data center; or a system implemented at least partially using cloud computing resources.

10. A processor comprising:

processing circuitry to:

receive, from a computing device, first pixel data representative of one or more first peak pixel values corresponding to a first subset of pixels of a first image, the first pixel data generated using the computing device and based at least in part on an analysis of the first image;

determine, based at least in part on the one or more first peak pixel values, one or more illumination values corresponding to one or more backlights of a display panel;

receive, from the computing device and after the first pixel data is received, first image data representative of first pixel values of at least the first subset of pixels of the first image;

update, based at least in part on the one or more illumination values, at least one of the first pixel values to generate one or more updated pixel values;

cause display of the first image using the one or more illumination values for the one or more backlights and the one or more updated pixel values for the first subset of pixels on the display panel;

while the first image is being displayed on the display panel, receive, from the computing device, second pixel data representative of one or more second peak pixel values corresponding to a second subset of pixels of a second image, the second pixel data generated using the computing device and based at least in part on an analysis of the second image; and receive, from the computing device and after the second pixel data is received, second image data representative of second pixel values of at least the second subset of pixels of the second image.

11. The processor of claim 10, wherein the display of the first image is caused by:

causing a current to be driven to the one or more backlights based at least in part on the one or more illumination values; and causing a voltage to be driven to pixel valves of the display panel corresponding to the first subset of pixels based at least in part on the one or more updated pixel values.

12. The processor of claim 10, wherein the first pixel data and the second pixel data are generated using one or more graphics processing units (GPUs) of the computing device, the one or more backlights include light-emitting diodes (LEDs), and the display panel includes a liquid-crystal display (LCD).

13. The processor of claim 10, wherein at least one of the first pixel values is updated based at least in part on one or more other illumination values corresponding to one or more other backlights located a distance from the first subset of pixels.

14. The processor of claim 10, wherein the one or more backlights include at least a backlight most closely located to a location of a center pixel of the first subset of pixels on the display panel.

15. The processor of claim 10, wherein the first pixel data representative of the one more first peak pixel values is generated by:

generating one or more histograms corresponding to the first pixel values of the first subset of pixels; and determining the one or more first peak pixel values using the one or more histograms.

16. The processor of claim 14, wherein the one or more backlights include backlights adjacent to a backlight most closely located to the location of the center pixel of the first subset of pixels on the display panel.

17. The processor of claim 16, wherein the backlights adjacent to the backlight are within a number of rows and columns of the backlight.

18. A method comprising:
  determining, using a computing device communicatively coupled to a display device, one or more first peak pixel values corresponding to a first subset of pixels of a first image;
  sending, using the computing device and to the display device, first pixel data representative of the one or more first peak pixel values;
  after the sending of the first pixel data, sending, using the computing device and to the display device, first image data representative of first pixel values corresponding to at least the first subset of pixels;
  determining, using the computing device, one or more second peak pixel values corresponding to a second subset of pixels of a second image;
  while the display device is displaying the first image; sending, using the computing device and to the display device, second pixel data representative of the one or more second peak pixel values; and
  after the sending of the second pixel data, sending, using the computing device and to the display device, second image data representative of second pixel values corresponding to at least the second subset of pixels.

19. The method of claim 18, wherein the method further comprises selecting the one or more backlights based at least in part on a shape of light distribution from a backlight of the one or more backlights.

20. The method of claim 18, wherein the determining the one or more second peak pixel values corresponding to the second subset of pixels of the second image occurs at least partially during the sending of the first image data.

* * * * *